Figure 1:
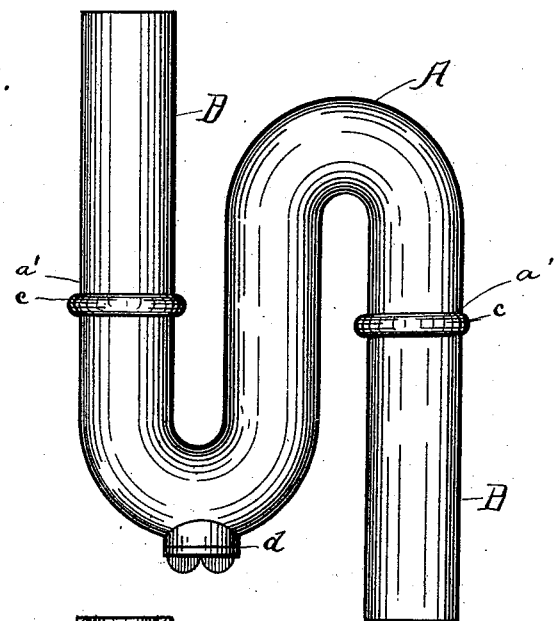

(No Model.)

H. C. MONTGOMERY.
SINK TRAP.

No. 528,335. Patented Oct. 30, 1894.

WITNESSES:
Victor M. Schneider
N. L. McLane

H. C. Montgomery
INVENTOR,

BY H. F. Fisher,
his ATTORNEY.

UNITED STATES PATENT OFFICE.

HARRY C. MONTGOMERY, OF CLEVELAND, OHIO.

SINK-TRAP.

SPECIFICATION forming part of Letters Patent No. 528,335, dated October 30, 1894.

Application filed April 30, 1891. Serial No. 391,051. (No model.)

*To all whom it may concern:*

Be it known that I, HARRY C. MONTGOMERY, a citizen of the United States, residing at Cleveland, in the county of Cuyahoga and State of Ohio, have invented certain new and useful Improvements in Sink-Traps; and I do hereby declare that the following is a full, clear, and exact description of the invention, which will enable others skilled in the art to which it appertains to make and use the same.

My invention relates to sink traps, of the variety known as S traps, in which a water seal alone is employed. Hitherto this style of trap has been made exclusively of lead, in the first instance, by bending a straight pipe to the desired shape, and latterly by a process of drawing over a steel core which gives the trap its shape; but in either or any case where lead alone is used the trap is so liable to irreparable injury, particularly in its bent portion, that notwithstanding the very great care exercised in handling the trap, a heavy loss is constantly entailed upon manufacturers and dealers therein because of this easily injured portion. Indeed there is never a time from the moment one of these all lead traps is made till it goes out of use that it is not liable to easy and fatal injury. This is accounted for by reason of the softness of the material and the inaccessibility of the injured part. Thus suppose that at any time by accident, awkwardness, or other cause, a dent or depression be formed in the S part that will measurably obstruct the flow and form a place for lodgment for refuse. It is then worthless for sale or use because no one wants it, and it cannot be repaired or fixed because there is no way of getting at the inside of this bent portion to remedy the injury. The entire trap must, therefore, be thrown at once into the scrap heap as a dead loss to the holder except for its value as lead. This injury may come in shipping, or anywhere along the line of its handling to the moment the plumber has put it in position; or it may come after it is in position, as frequently occurs through awkwardness or carelessness which renders removal necessary. This very serious objection to the S lead trap has been long felt, but has not, to my knowledge, been overcome prior to my invention. Again, this style of trap as heretofore manufactured and sold has been made simply in its S portion without any attachments. This has in all cases rendered it necessary for the plumber, when he came to put in a trap, to make at least two wipe joints in making the connections. Thus suppose we have a trap to place two feet from the floor. The regular iron pipe connecting with the sewer ends at the floor, and the plumber puts in a joint of lead pipe the requisite length to connect said iron pipe with the trap. This necessitates two wipe joints, one at each end of the connecting piece, which takes time and is expensive. I simplify and cheapen this work by providing a stock of S traps with lead pipe extensions of equal length at each side, but of a variety of lengths in the assortment of traps kept on hand, so that a plumber may choose the length or size the case in hand requires and thus obtain an S trap with a lead joint already attached. Then when he puts the trap in place he has only one joint to wipe at each side, or two such joints instead of four as formerly. This works material economy and convenience in the art.

Now, in order to overcome the objection hereinbefore pointed out to the S part of the trap, I make the said part of some suitable hard metal, like brass, which is proof against injury in shipping or handling or otherwise. Then I solder the lead section or part thereon and thus make a new article of manufacture not hitherto known and which supplies a long felt need in the art.

Figure 2:
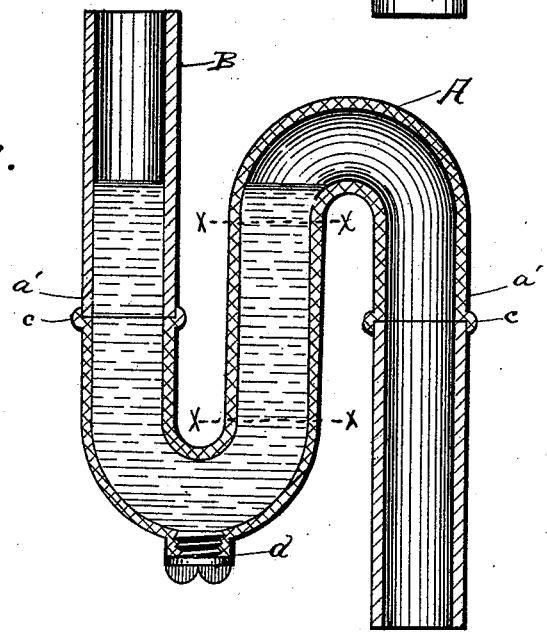

In the accompanying drawings Figure 1 is a side elevation of my improved trap showing one size of lead sectional extension, and Fig. 2 is a central longitudinal section thereof.

A represents the central portion of the trap, made of hard metal like brass, or the like, and cast in the shape here shown. This shape is approximately that of the letter S, with the difference, however, that the body, a, between the two cross lines x, x, is deeper, relatively to the bent ends, than in the letter S, and is straight instead of curved. Then again the ends, a', are brought in nearer to the central portion a than in the letter S and are parallel to said central portion. This construction has the advantage of deepening the water seal, which has been greatly needed in these traps, and at the same time keeping the trap within small or limited space, which is desirable. This construction is only possible in a cast trap and could not be made by drawing over a steel core because the core could not be gotten out. This central portion, A, comprises all, or substantially all, of the curved part of the trap, in which curved portion, as already pointed out, fatal injury has heretofore been liable to occur; but it being of hard metal in my trap such injury from shipping and in shop wear and the necessary handling is wholly prevented. To either extremity or end of the middle section A I permanently attach a lead section or extension B, by soldering or other equivalent process. In the same trap these end sections are preferably of equal length, but longer and shorter sections are kept in stock so that a plumber may choose the size he wants and thus save at least two wipe joints with each trap, as hereinbefore described. The section A has beads, $c$, around the outside of its ends and extending half way beyond the said ends, and the extension pipes B come within these beads and rest against the ends of the part A flush with the inside surface thereof so as to form a smooth inside passage. This makes the several parts thus connected like a continuous pipe while, however, the central part is of hard metal and the extremities are of soft metal. If injury comes to these extremities it can be easily remedied. The bottom of the trap is provided with a screw plug, $d$, which serves the usual purpose.

The entire article thus constructed constitutes a new article of manufacture and sale, and is made and sold as shown.

Having thus described my invention, what I claim as new, and desire to secure by Letters Patent, is—

As a new article of manufacture, a sink trap of the S variety consisting of a hard metal central portion having its ends terminating about midway of the said central portion and extending in opposite directions, and soft metal pipe sections secured to the said ends and forming the terminals of the trap and open to be attached to the stationary lead pipes in a building, substantially as set forth.

Witness my hand to the foregoing specification this 27th day of April, 1891.

HARRY C. MONTGOMERY.

Witnesses:
H. F. FISHER,
NELLIE L. McLANE.